US010210418B2

(12) United States Patent
Liu et al.

(10) Patent No.: US 10,210,418 B2
(45) Date of Patent: Feb. 19, 2019

(54) OBJECT DETECTION SYSTEM AND OBJECT DETECTION METHOD

(71) Applicant: Mitsubishi Electric Research Laboratories, Inc., Cambridge, MA (US)

(72) Inventors: Ming-Yu Liu, Revere, MA (US); Oncel Tuzel, Cupertino, CA (US); Amir massoud Farahmand, Cambridge, MA (US); Kota Hara, Chelsea, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 228 days.

(21) Appl. No.: 15/218,182

(22) Filed: Jul. 25, 2016

(65) Prior Publication Data

US 2018/0025249 A1    Jan. 25, 2018

(51) Int. Cl.
*G06K 9/62* (2006.01)
*G06K 9/46* (2006.01)
(Continued)

(52) U.S. Cl.
CPC .............. *G06K 9/46* (2013.01); *G06F 3/01* (2013.01); *G06K 9/3241* (2013.01); *G06K 9/4642* (2013.01); *G06K 9/628* (2013.01); *G06K 9/66* (2013.01); *G06N 3/04* (2013.01); *G06N 3/0445* (2013.01); *G06N 3/0454* (2013.01); *G06N 3/08* (2013.01); *G06T 7/0081* (2013.01);
(Continued)

(58) Field of Classification Search
CPC .... G06K 9/0061; G06K 9/46; G06K 9/00523; G06K 2009/3291; G06T 2207/20084
See application file for complete search history.

(56) References Cited

U.S. PATENT DOCUMENTS

| 2016/0203525 | A1* | 7/2016 | Hara | G06Q 30/0271 |
| | | | | 705/14.56 |
| 2017/0132526 | A1* | 5/2017 | Cohen | G06N 99/005 |
| 2018/0005633 | A1* | 1/2018 | Bocklet | G10L 17/04 |

FOREIGN PATENT DOCUMENTS

WO    2014205231    12/2014

OTHER PUBLICATIONS

Girschick et al. "Region based Convolutional Networks for Accurate Object Detection and Segmentation," IEEE Transactions on Pattern Analysis and Machine Intelligence 38(1):1-1—Dec. 2015.
(Continued)

*Primary Examiner* — Eueng-Nan Yeh
(74) *Attorney, Agent, or Firm* — Gene Vinokur; James McAleenan; Hironori Tsukamoto (57) ABSTRACT

A method detects an object in an image. The method extracts a first feature vector from a first region of an image using a first subnetwork and determines a second region of the image by processing the first feature vector with a second subnetwork. The method also extracts a second feature vector from the second region of the image using the first subnetwork and detects the object using a third subnetwork on a basis of the first feature vector and the second feature vector to produce a bounding region surrounding the object and a class of the object. The first subnetwork, the second subnetwork, and the third subnetwork form a neural network. Also, a size of the first region differs from a size of the second region.

23 Claims, 9 Drawing Sheets

(51) Int. Cl.
*G06F 3/01* (2006.01)
*G06K 9/66* (2006.01)
*G06N 3/04* (2006.01)
*G06N 3/08* (2006.01)
*G06T 7/00* (2017.01)
*G06K 9/32* (2006.01)

(52) U.S. Cl.
CPC ...... *G06K 2209/21* (2013.01); *G06T 2200/28* (2013.01); *G06T 2207/20084* (2013.01)

(56) References Cited

OTHER PUBLICATIONS

Volodymyr Mnih et al., Recurrent Models of Visual Attention, Jun. 24, 2014, Retrieved from the Internet: https://papers.nips.cc/paper/5542-recurrent-models-of-visual-attention.pdf.

* cited by examiner

| # of episodes | 2 | 4 | 8 | 16 |
|---|---|---|---|---|
| mAP | 57.4 | 57.5 | 58.1 | 57.8 |

FIG. 9

| Network architecture | Stacked RNN w/ Elt. Max | RNN with w/ Elt. Max | Stacked RNN w/o Elt. Max | RNN w/o Elt. Max |
|---|---|---|---|---|
| mAP | 58.1 | 57.4 | 57.0 | 57.2 |

FIG. 10

| Continuous return vs. discrete return | Continuous | Discrete |
|---|---|---|
| mAP | 58.1 | 57.8 |

FIG. 11

| With background samples? | w/o | w/ |
|---|---|---|
| mAP | 58.1 | 57.6 |

FIG. 12

| Glimpse representation | x-shifting, y-shifting x-scaling and y-scaling | x-shifting, y-shifting |
|---|---|---|
| mAP | 58.1 | 57.3 |

FIG. 13

OBJECT DETECTION SYSTEM AND OBJECT DETECTION METHOD

FIELD OF THE INVENTION

This invention relates to neural networks, and more specifically to object detection systems and methods using a neural network.

BACKGROUND OF THE INVENTION

Object detection is one of the most fundamental problems in computer vision. The goal of an object detection is to detect and localize the instances of predefined object classes in the form of bounding boxes, e.g., with confidence values for given input images. An object detection problem can be converted to an object classification problem by a scanning window technique. However, the scanning window technique is inefficient because classification steps are performed for all potential image regions of various locations, scales, and aspect ratios.

The region-based convolution neural network (R-CNN) is used to perform a two-stage approach, in which a set of object proposals is generated as regions of interest (ROI) using a proposal generator and the existence of an object and the classes in the ROI are determined using a deep neural network. However, the detection accuracy of the R-CNN is insufficient for some case. Accordingly, another approach is required to further improve the object detection performance.

SUMMARY OF THE INVENTION

Some embodiments are based on recognition and appreciation of the fact that a method for detecting an object in an image includes extracting a first feature vector from a first region of an image using a first subnetwork; determining a second region of the image by processing the first feature vector with a second subnetwork, wherein a size of the first region differs from a size of the second region; extracting a second feature vector from the second region of the image using the first subnetwork; and detecting the object using a third subnetwork based on the first feature vector and the second feature vector to produce a bounding box surrounding the object and a class of the object, wherein the first subnetwork, the second subnetwork, and the third subnetwork form a neural network, wherein steps of the method are performed by a processor.

Accordingly, one embodiment discloses a non-transitory computer readable recoding medium storing thereon a program causing a computer to execute an object detection process, wherein the object detection process includes extracting a first feature vector from a first region of an image using a first subnetwork; determining a second region of the image by processing the first feature vector with a second subnetwork, wherein a size of the first region differs from a size of the second region; extracting a second feature vector from the second region of the image using the first subnetwork; and detecting the object using a third subnetwork on a basis of the first feature vector and the second feature vector to produce a bounding box surrounding the object and a class of the object, wherein the first subnetwork, the second subnetwork, and the third subnetwork form a neural network.

Another embodiment discloses an objection detection system that includes a human machine interface; a storage device including neural networks; a memory; a network interface controller connectable with a network being outside the system; an imaging interface connectable with an imaging device; and a processor configured to connect to the human machine interface, the storage device, the memory, the network interface controller and the imaging interface, wherein the processor executes instructions for detecting an object in an image using the neural networks stored in the storage device, wherein the neural networks perform steps of: extracting a first feature vector from a first region of the image using a first subnetwork; determining a second region of the image by processing the first feature vector with a second subnetwork, wherein a size of the first region differs from a size of the second region; extracting a second feature vector from the second region of the image using the first subnetwork; and detecting the object using a third subnetwork on a basis of the first feature vector and the second feature vector to produce a bounding box surrounding the object and a class of the object, wherein the first subnetwork, the second subnetwork, and the third subnetwork form a neural network.

DETAILED DESCRIPTION OF THE PREFERRED EMBODIMENTS

Various embodiments of the present invention are described hereafter with reference to the figures. It would be noted that the figures are not drawn to scale elements of similar structures or functions are represented by like reference numerals throughout the figures. It should be also noted that the figures are only intended to facilitate the description of specific embodiments of the invention. They are not intended as an exhaustive description of the invention or as a limitation on the scope of the invention. In addition, an aspect described in conjunction with a particular embodiment of the invention is not necessarily limited to that embodiment and can be practiced in any other embodiments of the invention.

Some embodiments are based on recognition that an objection detection system that includes a human machine interface; a storage device including neural networks; a memory; a network interface controller connectable with a network being outside the system; an imaging interface connectable with an imaging device; and a processor configured to connect to the human machine interface, the storage device, the memory, the network interface controller and the imaging interface, wherein the processor executes instructions for detecting an object in an image using the neural networks stored in the storage device, wherein the neural networks perform steps of: extracting a first feature vector from a first region of the image using a first subnetwork; determining a second region of the image by processing the first feature vector with a second subnetwork, wherein a size of the first region differs from a size of the second region; extracting a second feature vector from the second region of the image using the first subnetwork; and detecting the object using a third subnetwork on a basis of the first feature vector and the second feature vector to produce a bounding box surrounding the object and a class of the object, wherein the first subnetwork, the second subnetwork, and the third subnetwork form a neural network.

Figure 1:
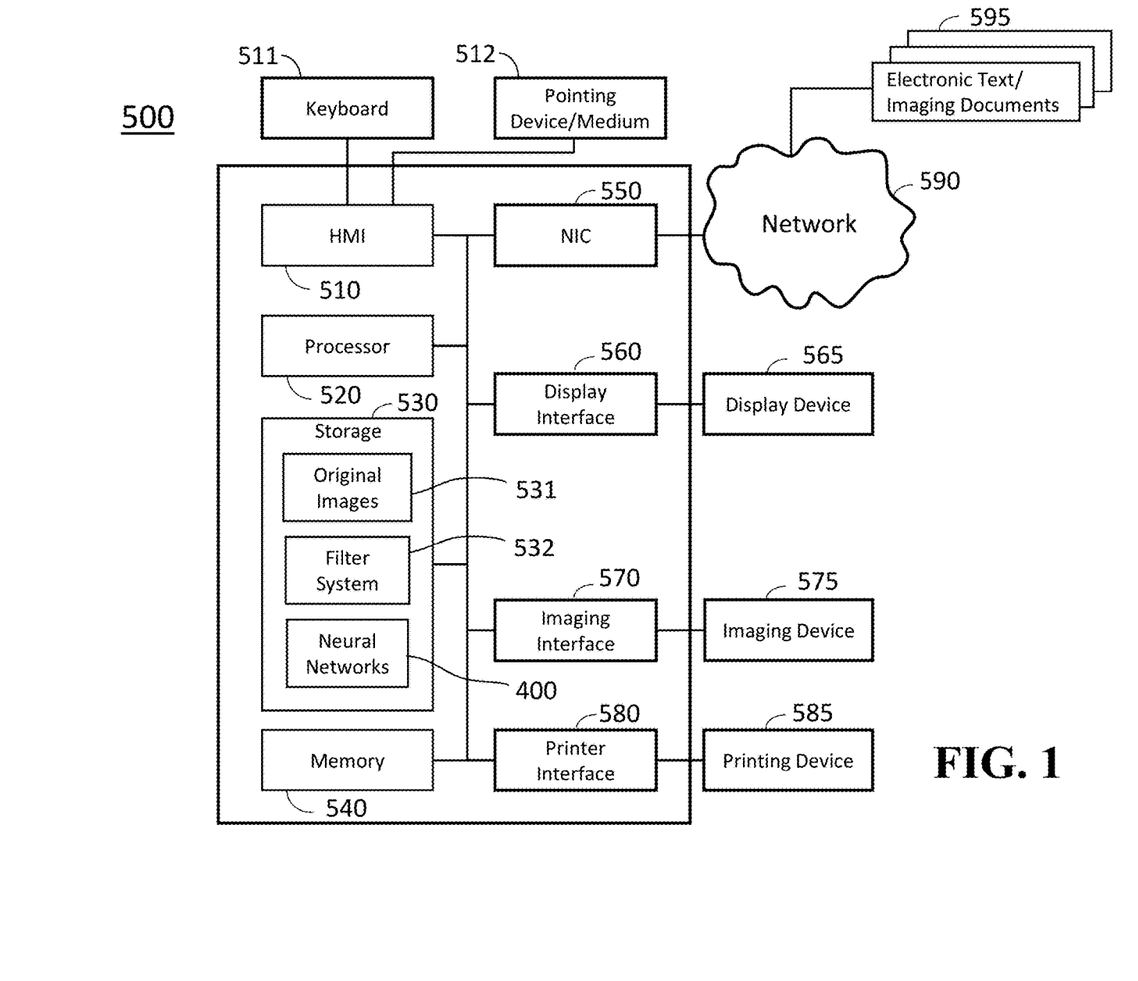
FIG. 1 is a block diagram of an object detection system for detecting an object in an image according to some embodiments of the invention.

FIG. 1 shows a block diagram of an object detection system 500 according to some embodiments of the invention. The object detection system 500 includes a human machine interface (HMI) 510 connectable with a keyboard 511 and a pointing device/medium 512, a processor 520, a storage device 530, a memory 540, a network interface controller 550 (NIC) connectable with a network 590 including local area networks and internet network, a display interface 560, an imaging interface 570 connectable with an imaging device 575, a printer interface 580 connectable with a printing device 585. The object detection system 500 can receive electric text/imaging documents 595 via the network 590 connected to the NIC 550. The storage device 530 includes original images 531, a filter system module 532, and a neural network 400. The pointing device/medium 512 may include modules that read programs stored on a computer readable recording medium.

For detecting an object in an image, instructions may be transmitted to the object detection system 500 using the keyboard 511, the pointing device/medium 512 or via the network 590 connected to other computers (not shown in the figure). The object detection system 500 receives the instructions using the HMI 510 and executes the instructions for detecting an object in an image using the processor 520 using the neural network 400 stored in the storage device 530. The filter system module 532 is operable to perform image processing to obtain predetermined formatted image from given images relevant to the instructions. The images processed by the filter system module 532 can be used by the neural network 400 for detecting objects. An object detection process using the neural network 400 is described below. In the following description, a glimpse region is referred as a glimpse box, a bounding box, a glimpse bounding box or a bounding box region, which is placed on a target in an image to detect the feature of the target object in the image.

Some embodiments are based on recognition that a method for detecting an object in an image include extracting a first feature vector from a first region of an image using a first subnetwork; determining a second region of the image by processing the first feature vector with a second subnetwork, wherein a size of the first region differs from a size of the second region; extracting a second feature vector from the second region of the image using the first subnetwork; and detecting the object using a third subnetwork based on the first feature vector and the second feature vector to produce a bounding box surrounding the object and a class of the object, wherein the first subnetwork, the second subnetwork, and the third subnetwork form a neural network, wherein steps of the method are performed by a processor.

Figure 2:
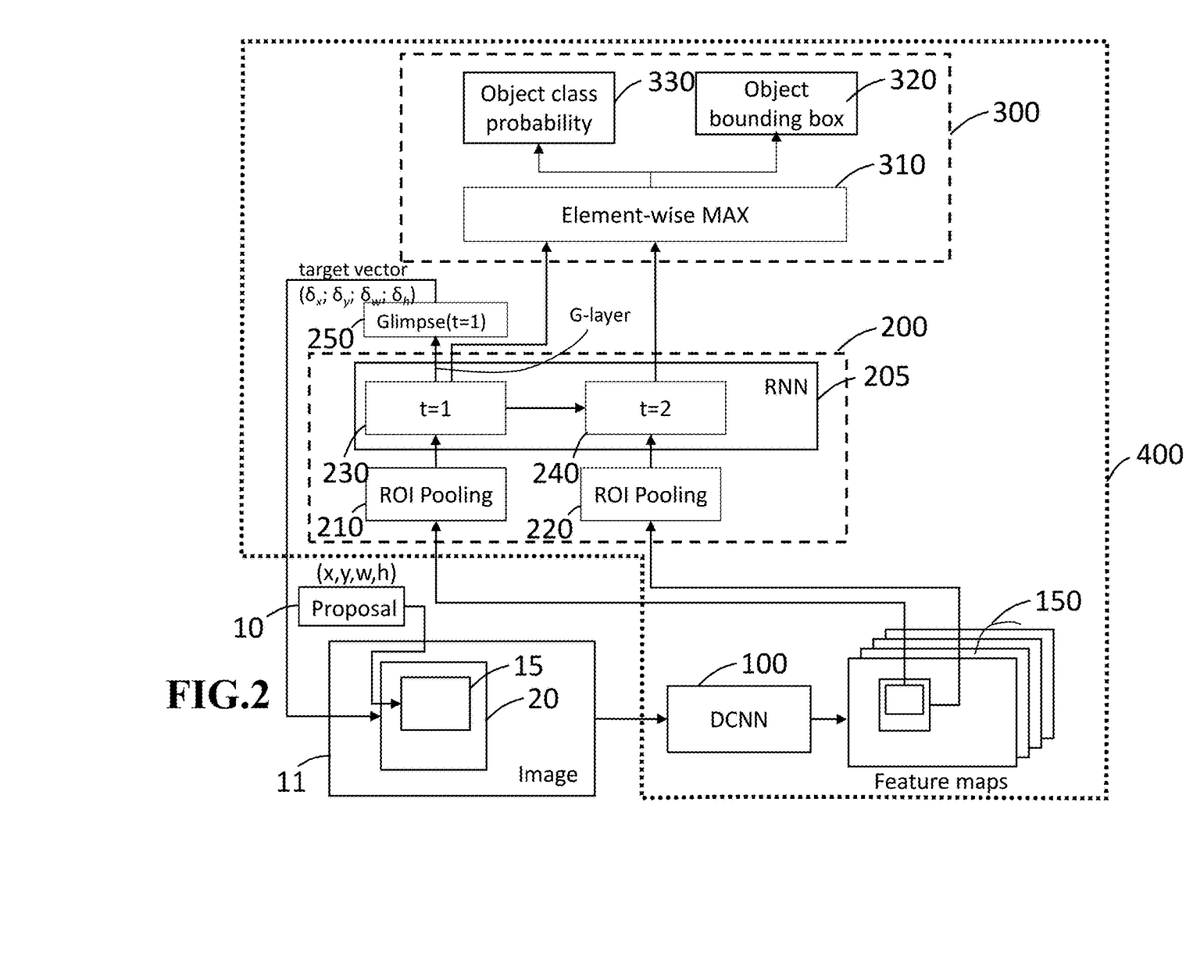
FIG. 2 is a block diagram of a neural network used in a computer-implemented object detection method for detecting the object in the image according to some embodiments.

FIG. 2 shows a block diagram of a neural network 400 used in a computer-implemented object detection method for detecting the object in the image according to some embodiments. The neural network 400 includes a first subnetwork 100, a second subnetwork 200 and a third subnetwork 300. The neural network 400 is designed to detect a target object in an image by extracting features from the target object in the image. The neural network 400 adaptively and sequentially places glimpse boxes on the target object of the image to extract the features of the target object, in which the glimpse boxes are designed to have square shapes or rectangular with different sizes and different aspect ratios in this embodiment. However, the shape of a glimpse box may be other predetermined shapes, such as triangle, hexagonal, circle, ellipse or any polygons according to the algorithm used in the neural network 400. The neural network 400, which applies the sequence of placing glimpse boxes on the target object, may be referred to as an attention-based object detection (AOD) network. The neural network 400 allows the object detection system 500 to make determination of classification of the target object in the image by providing the features extracted from the glimpse boxes corresponding the target object in the image. In this case, the first subnetwork 100 may be a deep convolutional neural network (DCNN) 100 to obtain better features of target objects in the image.

In an object detection process, when an image 11 is provided, the whole area of the image 11 is processed by the deep convolutional neural network (DCNN) 100 to compute and preserve a set of feature maps 150. Concurrently, a proposal generator 10 provides a proposal bounding box as a first glimpse box 15 to place on a target object of the image 11. The first glimpse box 15 has parameters including positions x, y, width w and h of the proposal bounding box in the image 11. The DCNN 100 also extracts a feature of the first glimpse box 15 from a region in the feature maps 150, in which the region in the feature maps 150 corresponds to the proposal bounding box (the first glimpse box 15) of the image 11.

The second subnetwork 200 includes region of interest (ROI) pooling modules 210 and 220, and a recurrent neural network (RNN) 205. The ROI pooling module 210 is applied to the first feature of the first glimpse box 15 to generate a first feature vector 230 by use of the RNN 205. The first feature vector 230 is transmitted to an Element-wise MAX 310 of the third subnetwork 300. The second subnetwork 200 also generates a target vector 250 that is used to encode a scale-invariant translation and a log-space height/width shift regarding a second glimpse box 20 relative to the first glimpse box 15 (the anchor bounding box). The second glimpse 20 is obtained by using the proposed bounding box 15 and the target vector 250. Successively, the DCNN 100 extracts a second feature based on the second glimpse 20 of the image 11. The second feature of the second glimpse box 20 is then applied to the ROI pooling module 220 of the second subnetwork 200 to generate a second feature vector 240. The second subnetwork 200 transmits the second feature vector 240 to the Element-wise MAX 310 of the third subnetwork 300 and the Element-wise MAX 310 preserves the second feature vector 240 for use of the object detection process. The third subnetwork 300 processes the second feature vector 230 and the third feature vector 240 and generates an object bounding box 320 and an object class probability 330 as outputs. Based on the outputs, the object detection system 500 makes a final decision on an object class and an object location of the target object in the image 11.

In some embodiments, the proposal generator 10 may be arranged in the neural network 400 according to the design of the neural network architecture.

Figure 3A:
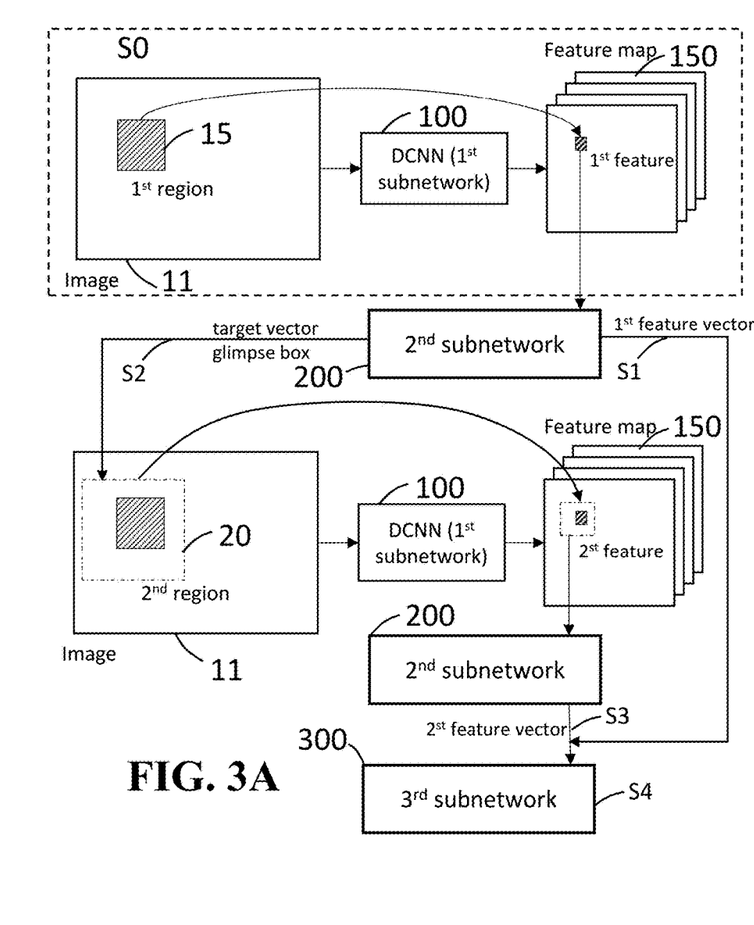
FIG. 3A is a block diagram illustrating processes of extracting feature vectors and determining regions in the image using subnetworks according to some embodiments.
Figure 3B:
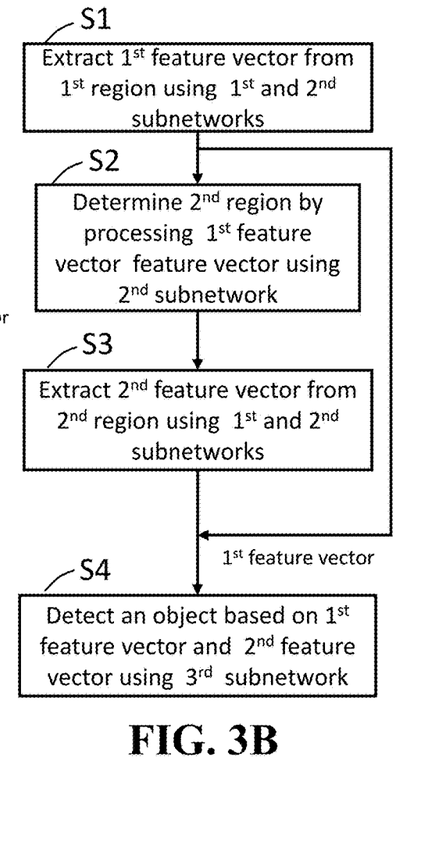
FIG. 3B is a flowchart showing the processes of extracting the feature vectors and determining the regions in the image using the subnetworks according to some embodiments.

FIG. 3A and FIG. 3B show a block diagram and a flowchart for illustrating the processes of extracting the feature vectors and determining the regions in the image used in the subnetworks according to some embodiments of the invention.

In a block S0 in FIG. 3A, an initial process of extracting a first feature vector using the first subnetwork 100 is shown. Upon the instructions given to the object detection system 500, the image 11 is provided into a working memory of the processor 520. The working memory can be an internal memory of the processor 520, the memory 540 or the storage 530 connected to the processor 520. The processor 520 may be more than one processing unit to increase the processing speed of object detections according to the system design. The DCNN 100 is applied to the whole area of the image 11 to obtain a set of feature maps 150, and subsequently, the proposal generator 10 provides a proposal bounding box as a first glimpse region 15. The first glimpse region 15 may be referred to as a first glimpse box 15. The first subnetwork 100 (DCNN 100) extracts a first feature of the first glimpse region 15 from a corresponding region of the feature maps 150 and transmits the first feature to the second subnetwork 200. In this case, the corresponding region of the feature maps 150 is associated to the first glimpse region 15 of the image 11.

Steps S1 and S2 in FIG. 3A and FIG. 3B show processes of extracting a first feature vector from the first region using the first and second subnetworks 100 and 200. In step S1 of FIG. 3A and FIG. 3B, after receiving the first feature of the first glimpse region 15 from the feature maps 150, the second subnetwork 200 generates and outputs a first feature vector. Concurrently, the second subnetwork 200 generates a target vector associated to a second glimpse region 20. In this case, the second subnetwork 200 determines the second glimpse region 20 by processing the target vector. The sizes of the first and second glimpse regions 15 and 20 are different from each other. The sequential order of steps S1 and S2 may be exchanged because the second subnetwork 200 can generate the first feature vector and the target vector without limiting the processing order as long as the first feature of the first glimpse region 15 has been acquired by the second subnetwork 200 in step S0.

In step S3 in FIG. 3A and FIG. 3B, a second feature vector is extracted from the second region using the first and second subnetwork 100. After receiving a second feature of the second glimpse region 20, the second subnetwork 200 transmits the second feature of the second glimpse region 20 to the third subnetwork 300. It should be noted that the first feature vector has been received by the third subnetwork 300 in step S1.

In step S4, the third subnetwork 300 detects an object in the image 11 based on the first and second feature vectors.

Figure 3C:
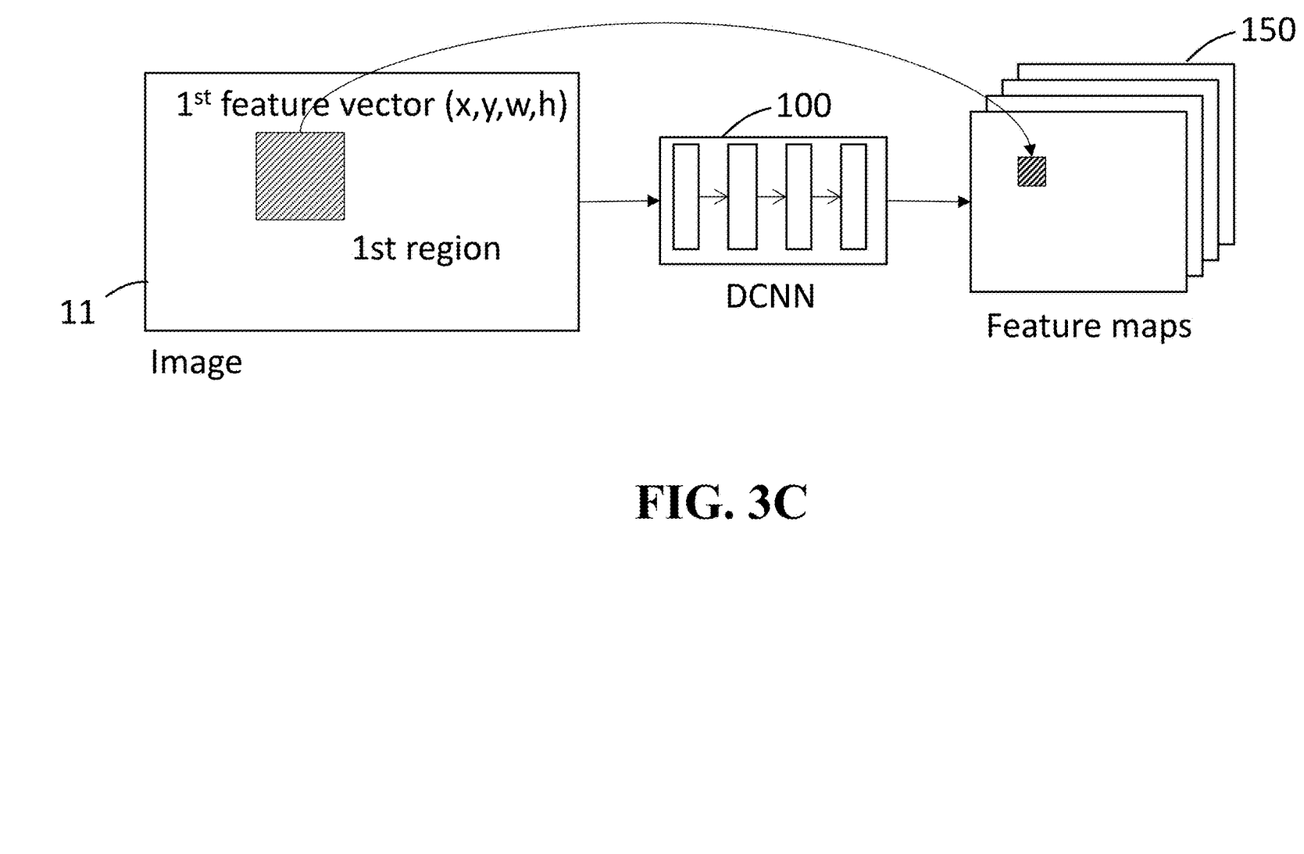
FIG. 3C is a block diagram of a subnetwork formed by a deep convolution neural network (DCNN) according to some embodiments.

FIG. 3C shows an example of the DCNN 100 including convolutional layers. In the DCNN 100, a set of feature maps 150 is computed at the last convolutional layer. The DCNN 100 computes so that a feature of the feature maps is associated to the first region of the image 11.

Further, in some embodiments, the DCNN 100 may be a pre-trained network such as the AlexNet or the VGGNet to obtain an equivalent effect for detecting objects in images.

Figure 4A:
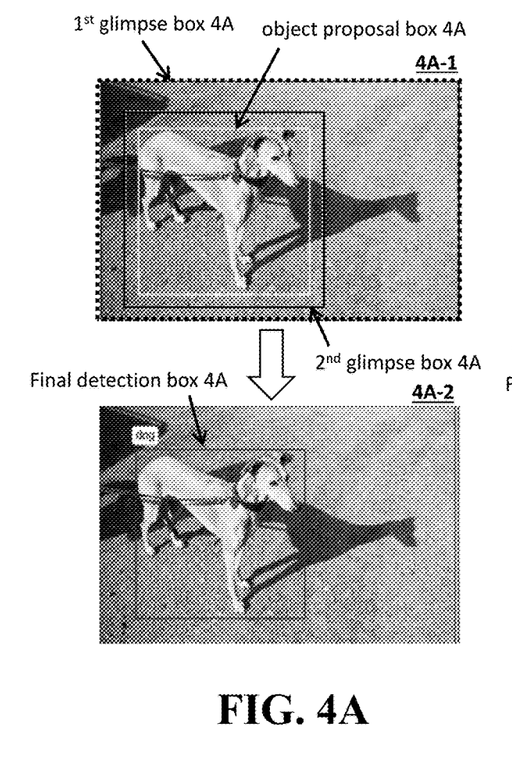
FIG. 4A and FIG. 4B are examples of placing glimpse boxes on target objects in images according to some embodiments.
Figure 4B:
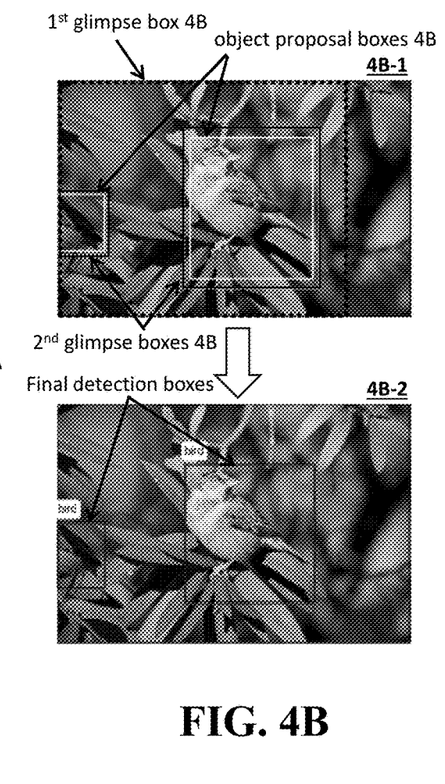

FIG. 4A and FIG. 4B show examples of placing glimpse boxes on target objects in images. In those examples, the object detecting process is performed by four steps of placing boxes on a target image of an image until a final detection box is placed on the target image.

FIG. 4A includes two images 4A-1 and 4A-2 at upper side and bottom side. The images 4A-1 and 4A-2 show an identical dog image as a target object. The image 4A-1 indicates an object proposal box 4A, a first glimpse box 4A and a second glimpse box 4A on the dog image.

In the first step of detecting process of the target object, the object proposal box 4A is generated as an anchor bounding box by the proposal generator 10 and placed on the image 4A-1 to surround the dog image, in which the object proposal box 4A is indicated by a bright box.

In the second step, the second subnetwork 200 generates the first glimpse box 4A and a first feature vector after receiving a feature of the object proposal box 4A extracted from the feature maps 150 by the first subnetwork 100. The first glimpse box 4A, indicated by dashed lines in the image 4A-1, is then placed on the image 4A-1 to surround the object proposal box 4A, and the first feature vector is transmitted to the third subnetwork 300. In this case, the size and shape of the first glimpse box 4A is configured to be different from those of the object proposal box 4A.

In the third step, the first subnetwork 100 extracts a feature of the first glimpse box 4A using the feature maps 150 and transmits the feature of the first glimpse box 4A to the second subnetwork 200. The second subnetwork 200 generates the second glimpse box 4A and a second feature vector based on the feature of the first glimpse box 4A and transmits the second feature vector to the third subnetwork 300. The second subnetwork 200 also places the second glimpse box 4A on the image 4A-1 to surround the object proposal box 4A. In this case, the area of the second glimpse box 4A is configured to be narrower than that of the first glimpse box 4A as indicated in the image 4A-1.

In the fourth step, a feature of the second glimpse box 4A is extracted from the feature maps 150 by the first subnetwork 100 and transmitted to the second subnetwork 200. Successively, the second subnetwork 200 generates and transmits a third feature vector to the third subnetwork 300.

In the final step, the third subnetwork 300 outputs an object class probability and an object bounding box based on the first, second and third feature vectors. The third subnetwork 300 determines that the target object is a dog places based on the object class probability and places the final detection box 4A on the image 4A-2 to surround the target surrounding the dog image as indicated in the image 4A-2.

FIG. 4B includes two images 4B-1 and 4B-2 at upper side and bottom side. The images 4B-1 and 4B-2 show bird images as target objects. The image 4B-1 indicates object proposal boxes 4B, first glimpse boxes 4B and second glimpse boxes 4B on the bird images. The object detecting process is performed by four steps of placing boxes on the target image until the final detection boxes are placed on the target images. As the object detecting process performed in FIG. 4B are identical to those described with respect to FIG. 4A, the detail descriptions are omitted. The image 4B-2 shows final detection boxes are placed on the bird images. It should be noted that the plural targets are correctly detected even part of one of the target objects is missing in this case.

Glimpse Box Generation

In some embodiments, a glimpse region is referred to as a glimpse box. A glimpse box G computed in time step t by the second subnetwork 200 is expressed by $G_t \in R^4$. For t=0, the first glimpse box $G_0$ is provided as a proposal bounding box by the proposal generator 10. The proposal bounding box is used as an anchor bounding box. For t>0, subsequent glimpse boxes $G_t$ are dynamically determined by the first subnetwork 100 and the second subnetwork 200 by aggregating information of features of prior glimpse boxes acquired in prior process steps.

For obtaining a glimpse box $G_t$, the scale-invariant and height/width normalized shift parameterization is employed with the anchor bounding box. The scale-invariant translation and the log-space height/width shift parameterization provides a target vector $(\delta_x, \delta_y, \delta_w, \delta_h)$ that indicates amounts of shift from the anchor bounding box. The target vector is expressed as follows.

$$(\delta_x, \delta_y, \delta_w, \delta_h) = \left( \frac{g_x - p_x}{p_w}, \frac{g_y - p_y}{p_h}, \log \frac{g_w}{p_w}, \log \frac{g_h}{p_h} \right) \quad (1)$$

where $(g_x, g_y, g_w, g_h)$ represents the center coordinate x and y, width w and height h of a glimpse box, and $(p_x, p_y, p_w, p_h)$ represents the proposal bounding box.

In the first time, the target vector $(\delta_x, \delta_y, \delta_w, \delta_h)$ is obtained from the proposal bounding box according to equation (1). In the following, a new glimpse box is obtained as $(p_x+p_w \delta_x, p_y+p_h \delta_y, p_w \exp(\delta_w), p_h \exp(\delta_h))$.

For each glimpse box $G_t$, a predetermined dimensional feature vector is extracted by applying the ROI pooling module 210 to the feature of the first glimpse box 15. The ROI pooling module 210 receives the feature of the first glimpse box 15 as an ROI. The ROI pooling module 210 divides the feature of the first glimpse box 15 into a predetermined grid of sub-windows and then max-pools feature values of the feature of the first glimpse box 15 in each sub-window. The feature values pooled fed into a recurrent neural network (RNN) 205 having layers fc6 and fc7.

Figure 5:
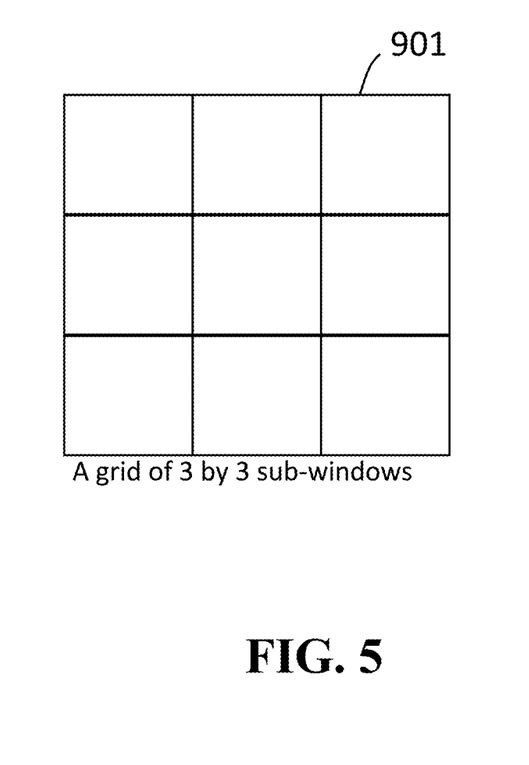
FIG. 5 shows sub-windows of first or second region divided into 3×3 grids.

FIG. 5 shows an example of 3×3 grid of sub-windows 901. In this case, the feature of the first glimpse box 15 is divided into 3×3 grids of the sub-windows according to a predetermined architecture of the recurrent neural network.

Figure 6:
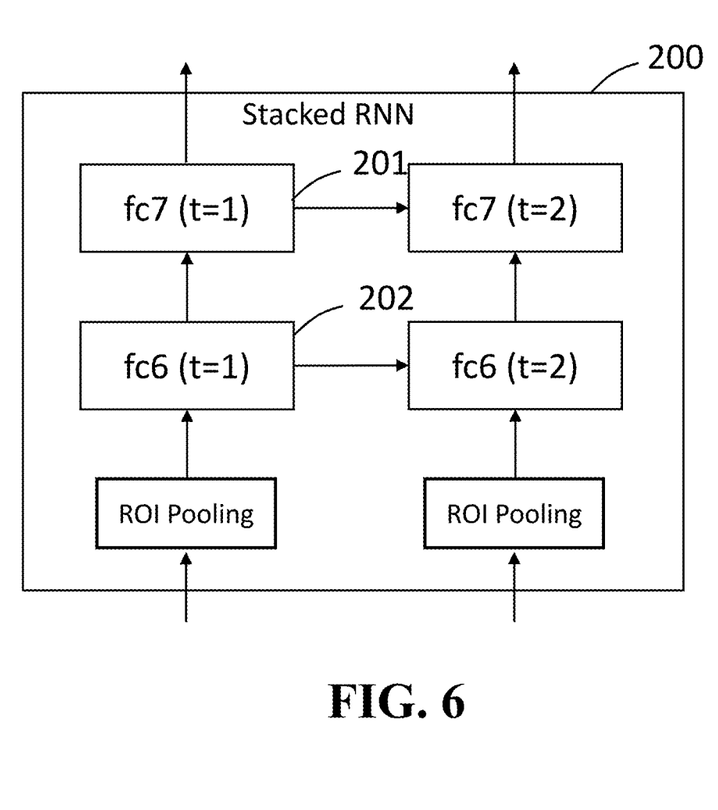
FIG. 6 is a block diagram of a subnetwork formed by a stacked RNN according to some embodiments.

In some embodiments, the RNN 200 may be a stacked recurrent neural network (stacked RNN). FIG. 6 shows the stacked RNN 200 to which the feature values are fed from the ROI pooling modules 210 and 220. The stacked RNN 200 includes two layers of fc6 and fc7, in which the given feature values processed along directions of the arrows as indicated in FIG. 5.

Figure 7:
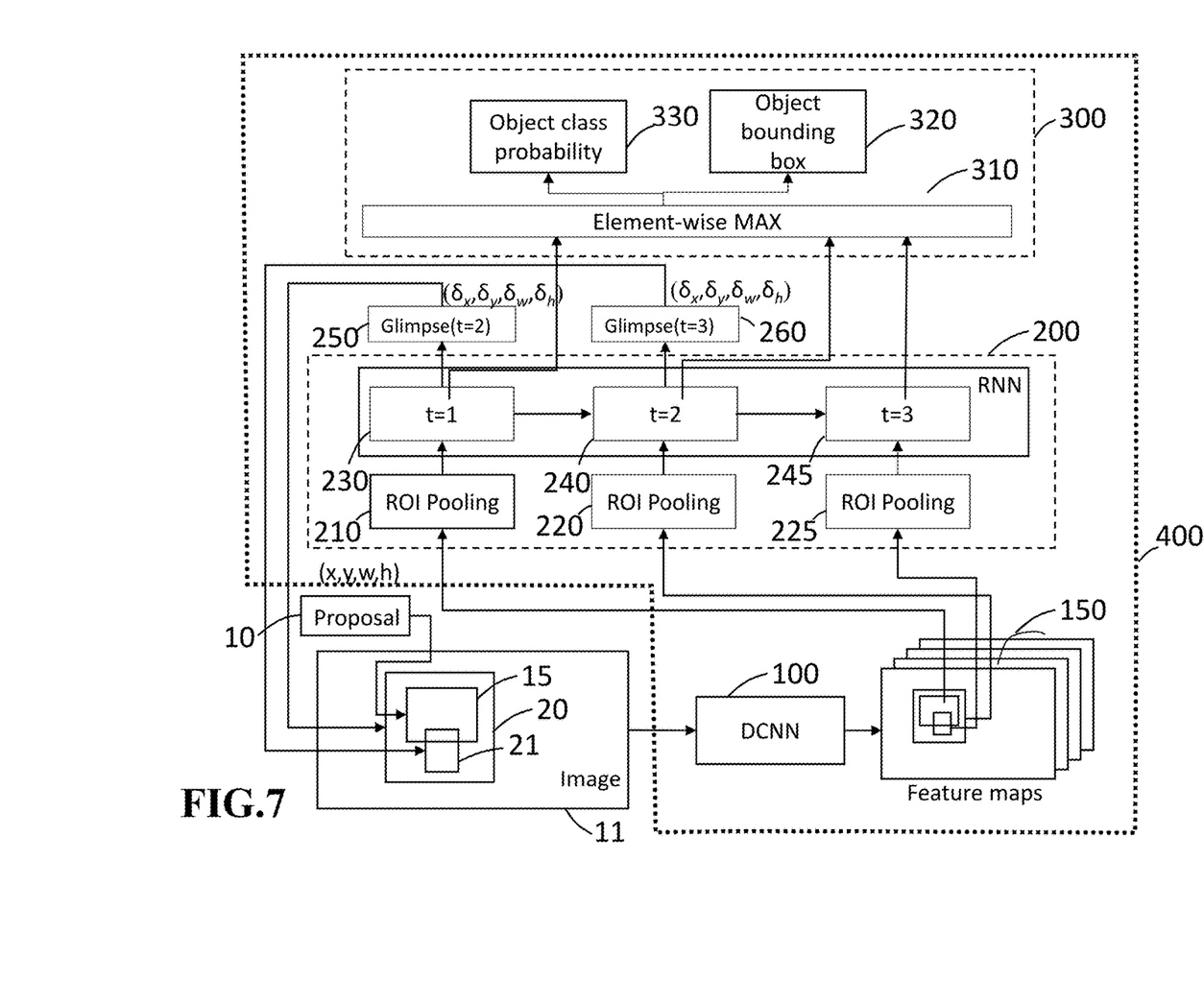
FIG. 7 is a block diagram of network modules used in a computer-implemented object detection method for detecting the object in the image according to some embodiments.

In some embodiments, the stacked RNN 200 may include three steps. FIG. 7 shows an example of the stacked RNN 200 having three steps. In this case, a first glimpse box is generated by the proposal generator 10, and a second glimpse box and a third glimpse box are generated through the ROI pooling modules 210 and 220, respectively. As each step of generating glimpse boxes and glimpse vectors is identical to that described in the case of FIG. 2, detailed descriptions are omitted.

Figure 8:
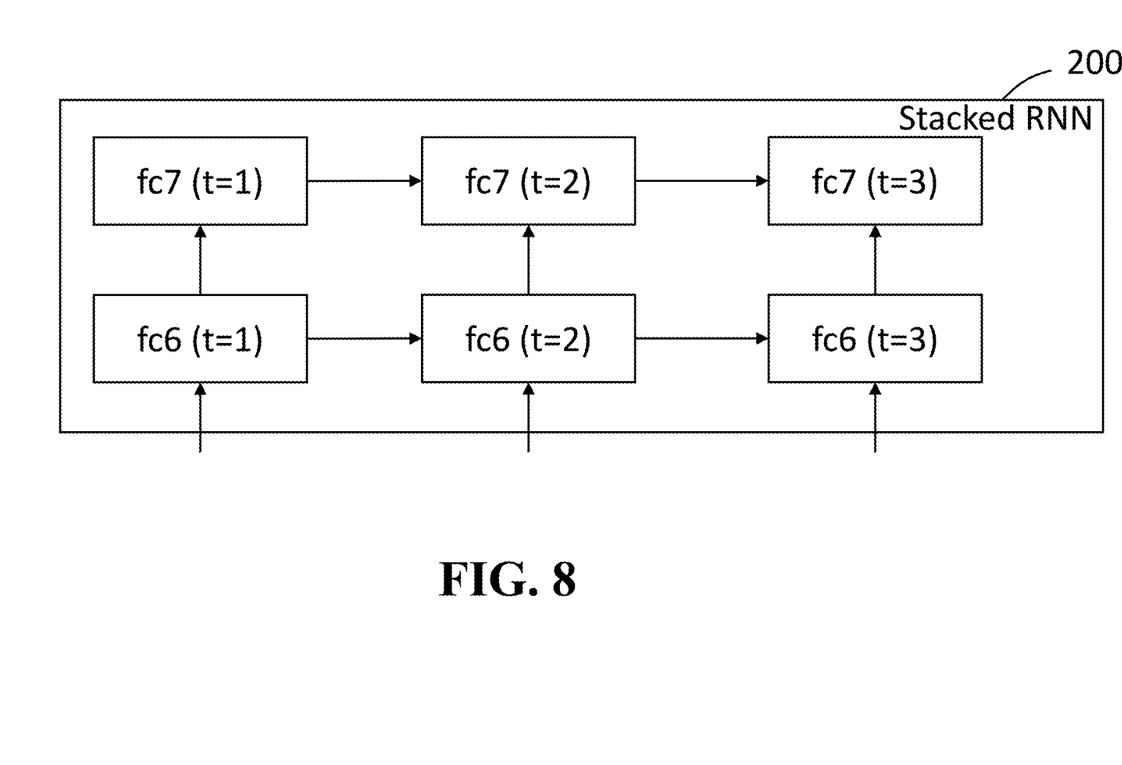
FIG. 8 is a block diagram of a subnetwork formed by a stacked RNN according to some embodiments.

In this case, the subnetwork 300 determines an object class probability and an object boundary box based on the first, second and third feature vectors. FIG. 8 shows an example of the stacked RNN 200 including three steps according to some embodiments. The arrows indicate data processing flows in the stacked RNN 200.

The number of layers fc6 and fc7 may be increased more than three according to the architecture design of a stacked RNN.

In some embodiments, the DCNN 10 may be trained using a reinforcement learning algorithm as another architecture of network to generate glimpses in order to improve the detection performance.

Reinforcement Learning and Network Training

In a process of a reinforcement learning algorithm, a reinforcement learning agent (RL agent) continually interacts with an environment by observing a state $x \in \chi$ of the environment, and then the RL agent chooses an action $a \in A$ according to its policy $\pi(\alpha|x)$ and a probabilistic mapping from the state to actions.

Depending on the current state and the action being chosen, the state of the RL agent in the environment changes to $X' \sim P(\cdot|x,\alpha)$. The RL agent also receives a real-valued reward signal $r \sim R(\cdot|x,\alpha)$ that is stored as a reword. This interaction continues for predetermined finite number of steps T. An outcome resulted from the interaction in each of steps T is referred to as an episode $\xi$.

The RL agent is configured to maximize the sum of rewards received in all episodes, $R(\xi) = \Sigma_{t=1}^{T} r_t$. In this case, $R(\xi)$ represents a return of $\xi$. The goal of the reinforcement learning is to find a policy $\pi$ so that an expected return $J(\pi) \triangleq E_{\pi}[R(\xi)]$ is maximized, in which the policy $\pi$ is not learned based on the reword received in each of time steps T. In the reinforcement learning process, a policy gradient algorithm, which is called the REINFORCE algorithm, is employed. In this case, $\pi$ is parameterized by $\theta$. The policy gradient algorithm, in its simplest form, changes policy parameters in the direction of gradient of $J(\pi_\theta)$ by the gradient ascent update, $\theta_{i+1} \leftarrow \theta_i + \alpha_i \nabla J(\pi_{\theta_i})$ for some choice of step size $\alpha_i > 0$.

By using the Gaussian distribution as $\pi_\theta$, approximate gradients are computed by
generating multiple episodes under the current policy:

$$\nabla_\theta J(\pi_\theta) \approx \frac{1}{n} \sum_{i=1}^{n} R(\xi^{(i)}) \sum_{t=1}^{T} \frac{(a_t^{(i)} - \theta x_t^{(i)}) x_t^{(i)T}}{\sigma^2}. \quad (2)$$

The algorithm discussed above is a gradient ascent algorithm and introduced to the standard back propagation neural network training. In this embodiment, the neural network 400 is trained by back propagating both gradient from reinforcement learning and gradients from supervised training.

FIG. 2 shows a block diagram of the second subnetwork 200 formed by a stacked recurrent neural network (RNN). The second subnetwork 200 includes a stacked recurrent neural network (RNN) 205 and the ROI pooling modules 210 and 220. Recurrent connections are indicated as fc6 and fc7 in the figure.

The training data of the RNN 205 is constructed by a similar way to that of the region-based convolution neural network algorithm (R-CNN algorithm). Each proposal bounding box generated by the proposal generator 10 is assigned a class label c* among one background class and K foreground object classes according to the overlaps with the ground truth object bounding boxes. The background class can be any object that does not belong to the foreground classes.

Each proposal bounding box is given a bounding box target vector that encodes the scale-invariant translation and log-space height/width shift relative to the object. The bounding box target vector is not defined for the ground truth object bounding boxes, and thus they are not used for training the RNN 205.

The third subnetwork 300 provides the final outputs that are softmax classification scores and bounding boxes for all predefined foreground classes.

During training of the second subnetwork 200, ground-truth annotations are provided for all predefined foreground classes, and the Standard Back Propagation Through Time (BPTT) algorithm is used for training. In this case, the BPTT is not applied to train a glimpse generation layer (G-layer) in FIG. 2. Instead, the glimpse generation layer may be trained in the process of the policy gradient algorithm described above.

In some embodiments, the state $x \in \chi$ of the environment is an input given to a glimpse module (G-layer) in FIG. 2. The glimpse module 250 indicates a new glimpse region $G_t$ at time step t. During training, multiple episodes are performed from the proposal bounding boxes in steps T. Each of all episodes starts from the identical proposal bounding box provided by the proposal generator 10.

Gaussian noise is added to the current glimpse region G computed by the glimpse generation layer. In each episode, the third subnetwork 300 outputs class probabilities and object bounding boxes in the last time step. From each of the outputs, the neural network 400 computes a total reinforcement reward $R(\xi) = \Sigma_{t=1}^{T} r_t$, where each reward $r_t$ for an episode $\xi$ is expressed as follows:

$$r_t = \begin{cases} P(c^*) \times IoU(B_{c^*}, B_{c^*}^*) & (t = T) \\ 0 & (\text{otherwise}) \end{cases} \quad (3)$$

where P(c*) is the predicted probability of the true class c* and IoU is the intersection over union between a predicted bounding box for c* and a corresponding ground-truth bounding box corresponding to the predicted bounding box. Intuitively, if the glimpse bounding box after adding a Gaussian noise leads a higher class probability and a larger IoU, then a higher return is assigned to the corresponding episode. The REINFORCE algorithm updates the model such that the generated glimpses lead to higher returns.

In the following descriptions, a mean average precisions (mAP) is used as a parameter for evaluating a performance of object detections.

Some embodiments are based on recognition that a number of episodes used in training for obtaining reasonable object detection performance is eight or less than eight.

Figure 9:
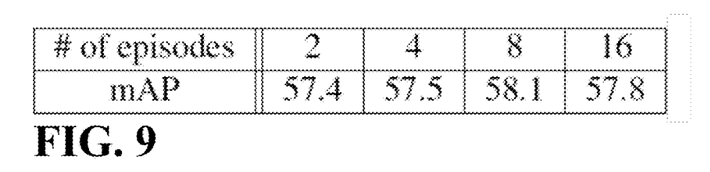
FIG. 9 is a comparison result that indicates an effect of a number of episodes generated from one sample in a mini-batch according to some embodiments.

FIG. 9 shows the effect of a number of episodes generated from one sample in a mini-batch according to some embodiments. As can be seen in FIG. 9, although a greater number of episodes tends to lead better performance, a case of eight episodes provides a reasonable performance result. Since the computation time and cost of computation increase with the number of episodes, the number of episodes may be chosen according to a predetermined design of neural networks.

Some embodiments are based on recognition that an architecture of a stacked RNN with an Element-wise MAX operation provides a better object detection performance compared to those of an RNN with an Element-wise MAX operation module, a stacked RNN without an Element-wise MAX operation module and an RNN without an Element-wise MAX operation module.

Figure 10:
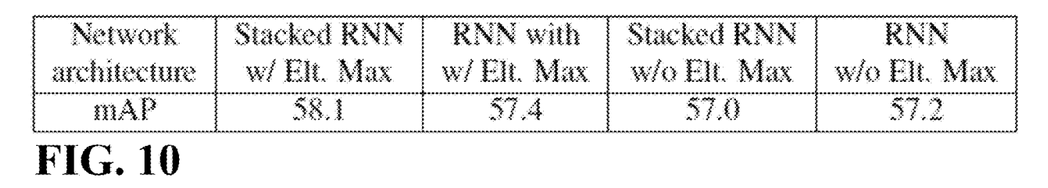
FIG. 10 is an example of performance results obtained by four different architecture setups according to some embodiments.

FIG. 10 shows performance results obtained by four different architecture setups according to some embodiments. As is seen, the stacked RNN with the Element-wise max provides better detection performance than other three architectures: an RNN with an Element-wise MAX operation module, a stacked RNN without an element-wise MAX operation module and an RNN without an Element-wise MAX operation module.

Figure 11:
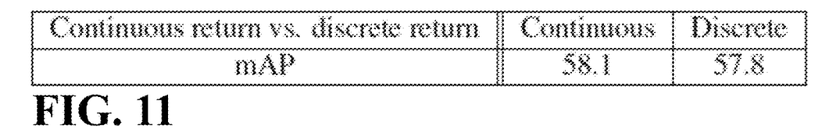
FIG. 11 is a comparison result of performances demonstrated by the continuous reward operation and the discrete reward operation according to some embodiments.

FIG. 11 shows demonstrate results indicating that the continuous reward operation is superior to the discrete reward operation according to some embodiments. Some embodiments are based on recognition that a continuous reward operation leads better performance than a discrete reward operation.

In each episode, the reinforcement reward $r_t$ is obtained. There are two reward operations to determine a value of the reinforcement reward. One is called the discrete reward operation, in which a reward is set to be $r_t=1$ if the highest scoring class is a ground-truth label and otherwise the reward is set to be $r_t=0$. In this case, there is no medium value between 0 and 1.

On the other hand, another reward operation is called the continuous reward operation, in which the reward ranges from 0 to 1. In this case, the reward is set according to equation (3) if the highest scoring class is the ground-truth label and an IoU obtained between a predicted bounding box and the ground-truth bounding box is greater than or equal to a predetermined IoU threshold value, and otherwise the reward is set to be $r_t=0$.

Some embodiments are based on recognition that excluding background samples yields a better performance.

Figure 12:
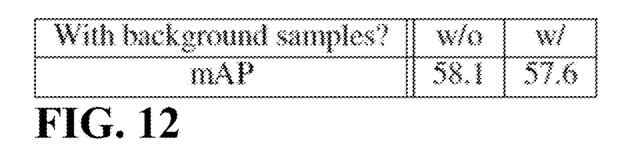
FIG. 12 is a comparison of performance results obtained by a case of excluding back-ground samples from the REINFORCE algorithm and a case of including back-ground samples from the REINFORCE algorithm.

FIG. 12 shows that a comparison between cases of including back-ground samples in the REINFORCE algorithm and excluding back-ground samples from the REINFORCE algorithm. As can be seen in FIG. 12, the case of excluding background samples yields a better performance. In this case, IOU in equation (3) is set to be unity (IOU=1) for the background samples because there is no ground-truth bounding boxes for the background samples.

Figure 13:
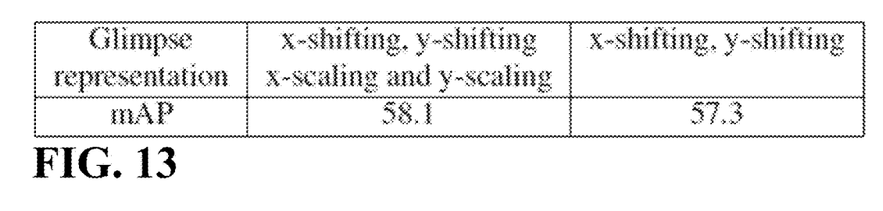
FIG. 13 is a table of performances obtained by using glimpses having a four-dimension vector leads and glimpses having a two-dimension vector.

FIG. 13 shows results indicating that the target vector having a four-dimension vector leads better performances than the glimpse having a two-dimension vector according to some embodiments.

Some embodiments are based on recognition that a target vector having a four-dimension vector including x-shifting, y-shifting, x-scaling and y-scaling provides better performance than a glimpse having a two-dimension vector including x-shifting and y-shifting.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for detecting an object in an image, comprising:
    extracting a first feature vector from a first region of an image using a first subnetwork;
    determining a second region of the image by processing the first feature vector with a second subnetwork, wherein a size of the first region differs from a size of the second region;
    extracting a second feature vector from the second region of the image using the first subnetwork; and
    detecting the object using a third subnetwork based on the first feature vector and the second feature vector to produce a bounding box surrounding the object and a class of the object, wherein the first subnetwork, the second subnetwork, and the third subnetwork form a neural network, wherein steps of the method are performed by a processor.

2. The method of claim 1, wherein the second subnetwork is a deep recurrent neural network.

3. The method of claim 2, wherein the deep recurrent neural network is a stacked recurrent neural network.

4. The method of claim 3, wherein the stacked recurrent neural network is formed by two hidden layers.

5. The method of claim 3, wherein the stacked recurrent neural network includes an Element-wise MAX operation.

6. The method of claim 3, wherein the stacked recurrent neural network is formed by more than two hidden layers.

7. The method of claim 2, wherein a step of extracting the first feature vector or extracting the second feature vector comprises:
    dividing the first region or the second region into a predefined grid of sub-windows;
    determining maximal values of features in each sub-window; and
    processing sequentially the maximal values by the recurrent neural network.

8. The method of claim 1, wherein the third subnetwork performs an element-wise max operation using the first feature vector and the second feature vector.

9. The method of claim 1, further comprising:
    rendering the detected object and the class of the object on a display device or transmitting the detected object and the class of the object over a network.

10. The method of claim 1, further comprising:
    processing the image using the first subnetwork to produce a set of feature maps of the image, wherein the first subnetwork is a deep convolution neural network (DCNN);
    determining the first region using a proposal generator;
    determining the first feature vector from the feature maps corresponding to the first region; and
    determining the second feature vector from the feature maps corresponding to the second region and hidden representations computed during generating the first feature vector in the second subnetwork.

11. The method of claim 10, wherein the feature maps are computed from last convolutional layers of the DCNN.

12. The method of claim 1,
    wherein the second subnetwork takes the first feature vector and outputs a target vector encoding a scale-invariant translation and a log-space height/width shift of the second region associated to the first region, and wherein the log-space height/width shift is expressed by $$(\delta_x, \delta_y, \delta_w, \delta_h) = \left(\frac{g_x - p_x}{p_w}, \frac{g_y - p_y}{p_h}, \log\frac{g_w}{p_w}, \log\frac{g_h}{p_h}\right)$$

wherein ($g_x$; $g_y$; $g_w$; $g_h$) represents a center coordinate indicating a position x and y, width w and height h of the first region, and ($p_x$; $p_y$; $p_w$; $p_h$) represents the first region.

13. The method of claim 12, wherein the second region is determined by using the first region and the target vector.

14. The method of claim 12, wherein the target vector is a four-dimension vector.

15. The method of claim 1, wherein a size of the second region is greater than a size of the first region.

16. The method of claim 1, wherein the first subnetwork is trained using a reinforcement learning algorithm.

17. The method of claim 16, wherein a reinforcement reward $r_t$ is obtained by equations, $$r_t = P(c^*) \times IoU(B_{c^*}, B^*_{c^*}) \text{ for } t=T$$

and $r_t = 0$ for $t \neq T$, wherein $P(c^*)$ is a predicted probability of a true class $c^*$, IoU is an intersection over union between a predicted bounding box $B_{c^*}$ for $c^*$ and a corresponding ground-truth bounding box $B^*_{c^*}$ corresponding to the predicted bounding box $B_{c^*}$, t is a time step of computation, and T is a predetermined number of time steps.

18. The method of claim 17,
    wherein a number of an episode is added by one when the reinforcement reward is determined by the third subnetwork, and wherein the number of episodes is set to be eight or less than eight.

19. The method of claim 17, wherein the reinforcement reward is determined based on a continuous reward operation.

20. The method of claim 1, wherein the first subnetwork is trained by a reinforcement learning algorithm.

21. The method of claim 20, wherein the reinforcement learning algorithm excludes to train back-ground samples in the image.

22. A non-transitory computer readable recoding medium storing thereon a program causing a computer to execute an object detection process, the object detection process comprising:
    extracting a first feature vector from a first region of an image using a first subnetwork;
    determining a second region of the image by processing the first feature vector with a second subnetwork, wherein a size of the first region differs from a size of the second region;
    extracting a second feature vector from the second region of the image using the first subnetwork; and
detecting the object using a third subnetwork on a basis of the first feature vector and the second feature vector to produce a bounding box surrounding the object and a class of the object,
wherein the first subnetwork, the second subnetwork, and the third subnetwork form a neural network.

23. An objection detection system comprising:
    a human machine interface;
    a storage device including neural networks;
    a memory;
    a network interface controller configured to connect with a network being outside the system;
    an imaging interface configured to connect with an imaging device; and
    a processor configured to connect to the human machine interface, the storage device, the memory, the network interface controller and the imaging interface,
    wherein the processor executes instructions for detecting an object in an image using the neural networks stored in the storage device, wherein the neural networks perform steps of:
    extracting a first feature vector from a first region of the image received via the network or the imaging interface connected with the imaging device using a first subnetwork;
    determining a second region of the image by processing the first feature vector with a second subnetwork, wherein a size of the first region differs from a size of the second region;
    extracting a second feature vector from the second region of the image using the first subnetwork; and
    detecting the object using a third subnetwork on a basis of the first feature vector and the second feature vector to produce a bounding box surrounding the object and a class of the object, wherein the first subnetwork, the second subnetwork, and the third subnetwork form a neural network.

* * * * *